CONTROLLABLE ALTERNATING-CURRENT GENERATOR

Filed June 29, 1961 2 Sheets-Sheet 1

Robert H. Pintell
INVENTOR.

BY Karl F. Ross

AGENT.

CONTROLLABLE ALTERNATING-CURRENT GENERATOR

Filed June 29, 1961 2 Sheets-Sheet 2

Robert H. Pintell
INVENTOR.

BY [signature]
AGENT.

United States Patent Office 3,088,075

Patented Apr. 30, 1963

3,088,075

CONTROLLABLE ALTERNATING-CURRENT GENERATOR

Robert H. Pintell, New York, N.Y., assignor to Intron International, Inc., Bronx, N.Y., a corporation of New York Filed June 29, 1961, Ser. No. 120,787
19 Claims. (Cl. 328—72)

My present invention relates to a circuit arrangement for producing an alternating current of controllable wave shape for the purpose of providing an output which is either stabilized at a predetermined level or variable in accordance with an input signal of relatively low frequency.

The use of gas thyratrons, ignitrons or equivalent solid-state devices, such as controlled rectifiers or four-layer diodes, as electronic switches in the generation of square-wave alternating current is well known. These three-electrode breakdown devices are generally connected in push-pull and are alternately triggered and quenched in the rhythm of a suitable control oscillation, the quenching being conventionally effected by means of a so-called commutating condenser connected across the output electrodes of these devices in such manner that the start of conduction through one device applies an extinction potential to the other. Since the condenser terminals are connected directly to the aforementioned output electrodes whose potentials are subject to abrupt changes, each change in conductivity is accompanied by a sudden charge reversal involving the flow of relatively large and wasteful switching currents.

It is, therefore, an object of my present invention to provide an improved circuit arrangement of the general type referred to in which the aforestated drawbacks are substantially eliminated and which, therefore, operates considerably more efficiently than known systems.

A more particular object of this invention is to provide means for conveniently varying the width of the square-wave pulses generated in such circuit arrangement for the purpose of controlling the magnitude of an output current applied with or without rectification to a load.

In accordance with this invention I provide, in combination with an electronic breakdown device or a pair of such devices connected in push-pull, positively controlled quenching means connected in the operating circuit of the breakdown device or devices for periodically de-energizing the latter by effectively creating a momentary interruption of the current flow in that circuit. Suitable quenching means adapted to be utilized for this purpose include various three-electrode devices of either the breakdown or the amplifier type, such as vacuum tubes, transistors, thyratrons, controlled rectifiers and their equivalents. The quenching device, responding to a suitably timed control pulse, may be so connected in series with the aforementioned operating circuit as to break that circuit for the duration of the control pulse, thereafter instantly restoring it to normal. It is also possible, however, to connect the quenching device to the operating circuit of the breakdown device through the intermediary of a reactive coupling, such as a transformer, adapted to act as a differentiator for converting the breakdown of a thyratron or similar electronic switch into a quenching pulse of short duration. The interval between the first or trigger pulses and the second or quenching pulses may be varied by suitable timer means preferably including an adjustable delay device, e.g. a magnetic amplifier.

With the aid of resonant commutation, i.e. a properly tuned output circuit adapted periodically to apply an extinction potential to the output electrodes of the breakdown device or devices as recently disclosed in my co-pending application No. 117,168 filed June 14, 1961, I can insure more precisely timed cutoffs whereby systems according to my present invention will work dependably and with great accuracy even with thyratrons and other electronic switches which, because of aging, are no longer suitable for use in conventional circuit arrangements for the generation of alternating current. Equally surprisingly, operating frequencies close to twice those obtainable with such known arrangements can be realized with my improved systems.

The above and other objects, features and advantages of my invention will become more fully apparent from the following detailed description, reference being made to the accompanying drawing in which.

Figure 1:
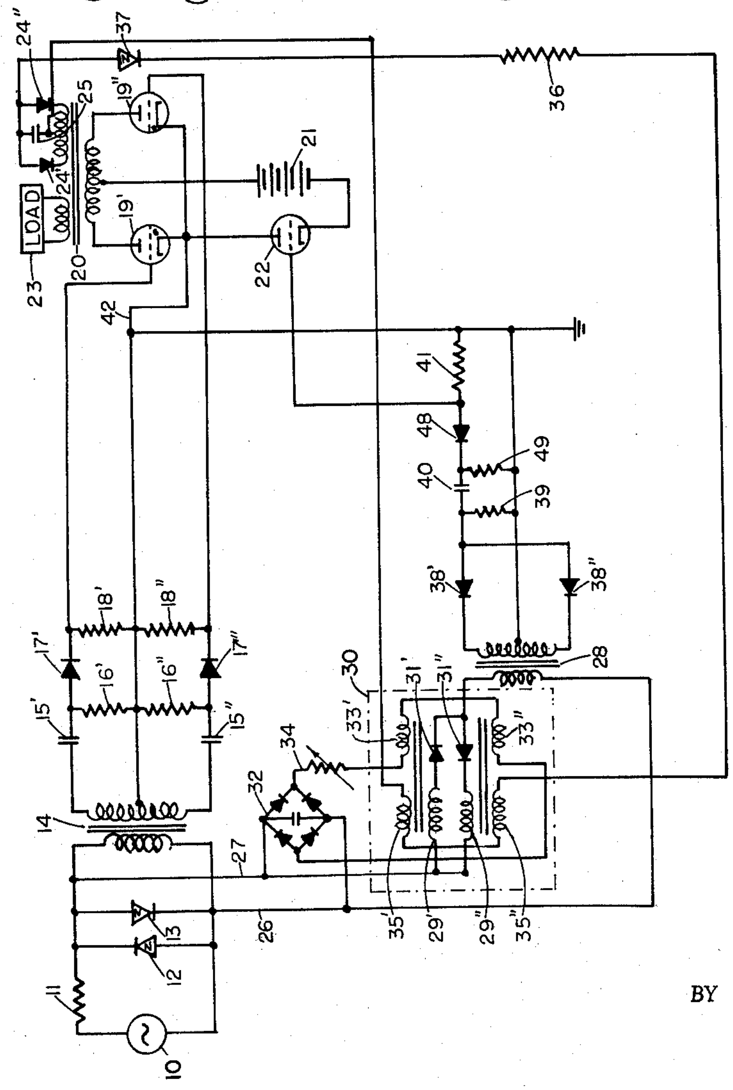
FIG. 1 is a circuit diagram of one embodiment.

The system shown in FIG. 1 comprises a source 10 of constant-frequency alternating current which serves only as a generator of switching signals and may therefore be of very low power. Connected across this source, in series with a ballast resistor 11, are a pair of oppositely poled avalanche-type or Zener diodes 12, 13 in parallel with each other and with the primary winding of an input transformer 14. The secondary of this transformer is center-tapped and feeds a balanced differentiation circuit including a pair of condensers 15′, 15″, two resistors 16′, 16″, a pair of rectifiers 17′, 17″ and two further resistors 18′, 18″. The ungrounded output terminals of the last-mentioned resistors are tied to the control grids of two push-pull-connected thyratrons 19′, 19″ whose cathodes are joined to the grounded bus bar 42 leading to the midpoint of the secondary of transformer 14 and whose plates are bridged by the primary of an output transformer 20, the center tap of this primary being connected to the positive pole of a source of direct current, shown as a battery 21, whose negative pole is returned to ground through the cathode-plate circuit of a vacuum triode 22. Output transformer 20 has two secondaries, one of them supplying current to a load 23 while the other feeds back a part of the output of the system to a full-wave rectification network comprising a pair of diodes 24′, 24″ and a smoothing condenser 25.

A control circuit bridged across the primary of input transformer 14 comprises two conductors 26, 27 serving to energize, in series with the primary of a switching transformer 28, the main windings 29′, 29″ of a magnetic amplifier 30 having the usual diodes 31′, 31″ serially connected thereto. A rectifier bridge 32, connected across the conductors 26 and 27, feeds a pair of biasing windings 33′, 33″ of magnetic amplifier 30 by way of an adjustable resistor 34. Amplifier 30 also has two control windings 35′, 35″ connected across the condenser 25 in series with a resistor 36 and a Zener diode 37.

The secondary of transformer 28 is center-tapped, similarly to that of transformer 14, and connected across a balanced differentiation circuit designed as a pulse-frequency doubler, this circuit including two rectifiers 38′, 38″ working into a resistor 39 and, in parallel therewith, into the series combination of a condenser 40, a further diode 48 and a control resistor 41. The latter is connected across the plate and the grid of triode 22, the rectifier 48 being so poled as to develop pulses of negative polarity across the resistor 41 for cutting off the normally conductive tube 22. In contradistinction thereto, the rectifiers 17′, 17″ of the main input circuit are so poled as to develop positive pulses across their associated resistors 18′, 18″ so as to trigger the respective thyratron 19′ or 19″ into a conductive condition, the latter persisting only until the current flow therethrough is blocked by a momentary cutoff of triode 22. The timing of this cutoff is adjustable controlled by the magnetic amplifier 30 to vary the output of the alternating-current generator 19′, 19″, 20 as will now be described with reference to FIG. 2.

Figure 2:
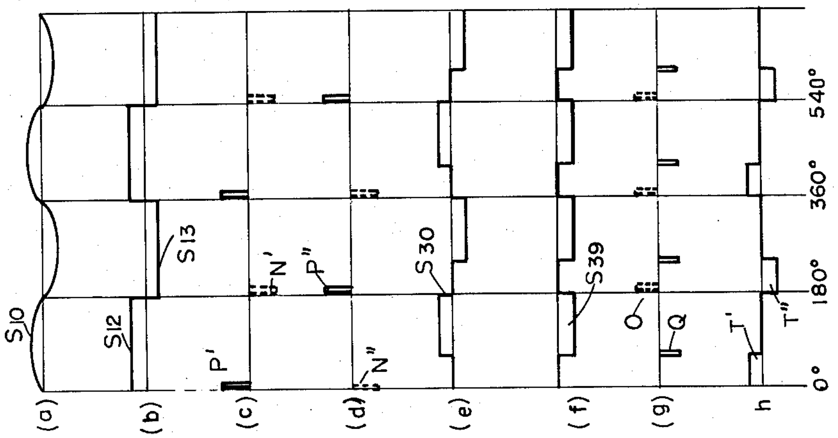
FIG. 2 is a set of graphs illustrating the mode of operation of a system as shown in FIG. 1.

FIG. 2(*a*) shows a sine curve S10 representing the output of alternating-current source 10. Through the clipping action of Zener diodes 12, 13 this wave is converted into an alternation of flat-topped positive and negative pulses S12, S13, as shown in FIG. 2(*b*), which are transmitted by transformer 14 to the two branches 15′, 16′ and 15″, 16″ of its differentiation network to produce two trains of positive trigger pulses P′, P″ alternating with negative pulses N′, N″, the latter pulses being suppressed by the rectifiers 17′, 17″; this has been illustrated in FIG. 2(*c*). Concurrently, through the operation of magnetic amplifier 30, there is developed across the primary of switching transformer 28 a rectangular wave S30, FIG. 2(*e*), with the cadence of pulses S12, S13 but with leading edges lagging behind those of the latter at a rate determined by the degree of core saturation of the magnetic amplifier 30. Upon rectification by the diodes 38′, 38″, the stepped wave S39 developed across resistor 39 has the shape shown in FIG. 2(*f*). Negative quenching pulses Q, alternating with positive pulses O which are suppressed by the rectifier 48, are derived from the wave S30 by the differentiation network 39–41, as illustrated in FIG. 2(*g*), and are developed across resistor 41 to cut off the triode 22 through which the thyratron 19′ or 19″, respectively triggered by a preceding pulse P′ or P″, has been discharging; thus, the current passing alternately through these thyratrons and transmitted through transformer 20 to load 23 has the shape of output pulses T′, T″ as shown in FIG. 2(*h*). The integrated magnitude of these pulses charges the condenser 25 to a voltage which, if sufficient to break down the Zener diode 37, causes the flow of a feedback current through control windings 35′, 35″ so as partially to offset the biasing current passed by windings 33′, 33″, thereby partly desaturating the magnetic amplifier 30 and advancing the quenching pulses Q to shorten the duration of thyratron pulses T′, T″ and to reduce the energy output of the system. In a state of balance, in which this output is of the desired magnitude, the voltage across condenser 25 will thus be at a value corresponding to a sharp bend on the reverse-voltage/current characteristic of Zener diode 37, i.e. to a point of incipient breakdown of that diode. The system of FIG. 1, accordingly, acts as a generator of stabilized alternating current which, if desired, may be rectified (e.g. by a network similar to the circuit 24′, 24″ 25) before being fed to the load 23.

Figure 3:
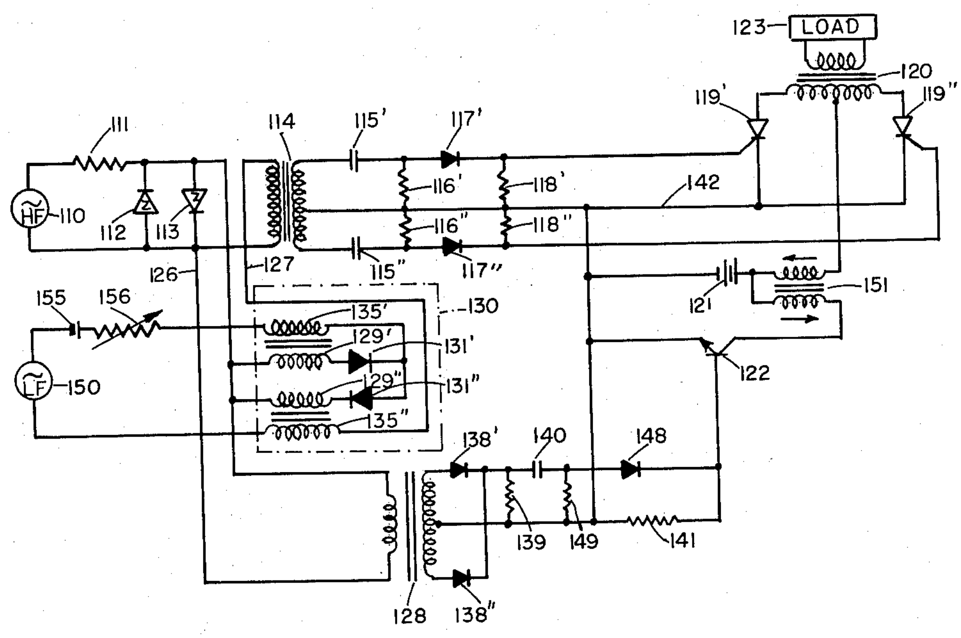
FIG. 3 is a circuit diagram similar to FIG. 1, illustrating another embodiment.

In FIG. 3 I have shown a modified system in which elements having counterparts in FIG. 1 have been designated by the same reference numerals preceded by the digit "1." A reversal of connections applies here the output (S12, S13) of source 110 to transformer 128 and the output (S30) of magnetic amplifier 130 to transformer 114. The thyratrons 19′, 19″ of the preceding embodiment have been replaced by controlled rectifiers 119′, 119″ whose cathode-gate circuits are alternately triggered in the rhythm of a source 110 of high-frequency alternating current by spikes P′, P″ (FIG. 2) generated by a differentiation circuit 115′, 116′, 115″, 116″ at the instants of pulses Q in FIG. 2(*g*) and passed by a pair of rectifiers 117′, 117″. The magnetic amplifier 130, whose main windings 129′, 129″ are energized by the rectangular pulses S12, S13 (FIG. 2) via conductors 126 and 127, has its control windings 135′, 135″ connected across a source 150 of low-frequency signal current in series with a source of bias current 155 and an adjustable resistor 156. The differentiated output of switching transformer 128 is a train of pulses corresponding to the positive spikes P′, P″ of FIG. 2 and occurring with invariable timing, these pulses being passed by a rectifier 148 and developed across a resistor 141 for periodically increasing the conductivity of a transistor 122 whose collector is connected to the positive pole of battery 121 through the primary of a quenching transformer 151 having its secondary in series with the anode-cathode circuit of each controlled rectifier 119′, 119″ which are triggered at intervals determined by the control signal from source 150. The relative polarity of the voltages impressed upon the primary of transformer 151 and induced in its secondary is so chosen, as indicated by the arrows, as to cut off the controlled rectifier 119′ or 119″, whichever has been conducting, upon the occurrence of a quenching pulse. The operation is otherwise identical with that of the system of FIG. 1, except that the output applied to load 123 by transformer 120 varies in accordance with the signal from source 150 instead of being stabilized at a predetermined level. In each instance the quenching means is a circuit element (22 or 151) which momentarily acts as a high impedance in series with the power supply 21 or 121 when triggered by a pulse from the magnetic amplifier.

Figure 4:
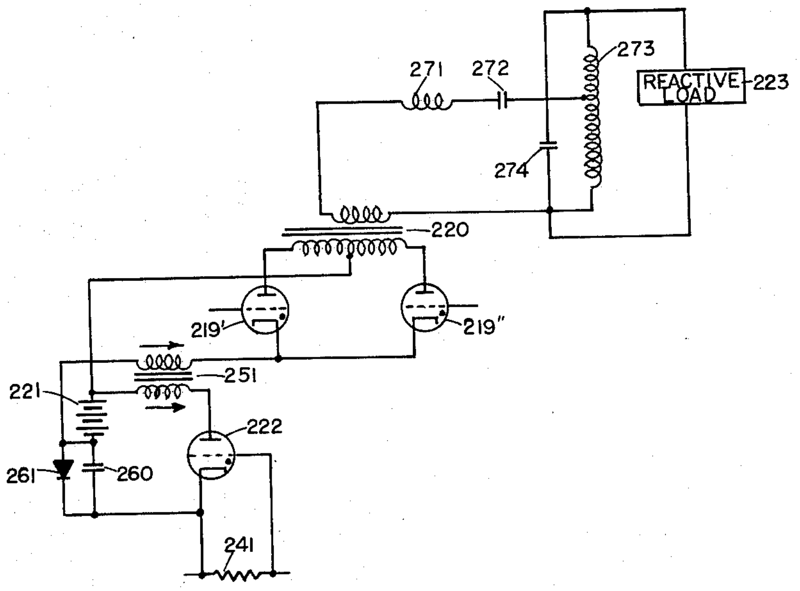
FIG. 4 is a partial circuit diagram representing a further modification.

The modification of FIG. 4 utilizes a breakdown-type device, i.e. a thyratron 222, as the means for quenching the push-pull-connected switching thyratrons 219′, 219″ which are alternately triggered, over circuits not further illustrated but similar to those shown in FIGS. 1 and 3, to drive a load 223 by way of a transformer 220. The quenching thyratron 222, triggered by positive pulses O (FIG. 2) developed across a resistor 241, is fired by current from battery 221 in series with the primary of transformer 251 to extinguish whichever thyratron 219′, 219″ happens to be conducting; a condenser, also in series with battery 221, is thereby discharged to a level causing the de-ionization of thyratron 222. The latter, accordingly, conducts for a relatively short period whose duration, however, is not critical and may be as high as, say, 20 to 30 electrical degrees as measured on the abscissa of FIG. 2; it will thus be evident that this thyratron may be of a type which, e.g. because of age, de-ionizes relatively slowly. During the remainder of the interval between quenching pulses O the condenser 260 is discharged through a suitably high leakage reactance here shown as a crystal diode 261 connected with reverse polarity across this condenser.

If the load is highly reactive, I prefer to insert between it and the output transformer a resonant circuit of the type disclosed in my recently filed co-pending application referred to above, as likewise illustrated in FIG. 4. This circuit includes a series-resonant network, composed of an inductance 271 and a capacitance 272, in cascade with a parallel-resonant network, composed of an inductance 273 and a capacitance 274, the circuit being thus similar to the one shown in FIG. 3 of my co-pending application. Parallel-resonant network 273, 274 should be tuned to the operating frequency of the switching-voltage source (10 or 110 in FIG. 1 or 3), i.e. to a frequency corresponding to the cadence of either of the pulse trains P′ and P″ shown in FIG. 2, whereas series-resonant network 271, 272 is advantageously tuned to a slightly different frequency so as to present a (preferably capacitive) reactance varying sharply with frequency fluctuations. The back-E.M.F. impressed upon the primary of transformer 220 by this circuit will help extinguish the thyratrons 219′, 219″ at the appointed times as determined by the control circuits previously described.

In all the illustrated embodiments it is possible to omit some of the circuit elements included therein, such as the elements 15″ to 19″ and 38″ in FIG. 1 and corresponding elements in the other figures, to convert the system from push-pull to unbalanced or single-ended operation. Also, as will be apparent from FIG. 2, the operating current for the breakdown devices 19′, 19″ etc. need not be supplied by a D.-C. source such as battery 21 but may be a raw-rectified or a sinusoidal alternating current, e.g. one of relatively low frequency (the system remaining inoperative during alternate half-cycles thereof) or one whose frequency is an even multiple if the frequency of switching-voltage source 10 or 110 of the maximum duration of pulses T', T'' is not to exceed a corresponding fraction of a half-cycle of signal wave S10. These and other modifications readily apparent to persons skilled in the art, as well as interchange or combination of compatible features disclosed in connection with different embodiments, are intended to be embraced within the scope of the present invention as defined in the appended claims.

I claim:

1. A generator of alternating current, comprising an electronic breakdown device with two output electrodes and a control electrode for triggering it into a conductive condition, said device being provided with an output circuit including a source of operating current connected across the output electrodes thereof, a source of first pulses connected to said control electrode for periodically rendering said device conductive, quenching means in said output circuit adapted to restore said device from said conductive condition to a non-conductive state, and a source of second pulses synchronized with said source of first pulses connected to said quenching means for periodically rendering the latter effective, thereby limiting the conductive condition of said device to an interval of predetermined duration.

2. A generator of alternating current, comprising an electronic breakdown device with two output electrodes and a control electrode for triggering it into a conductive condition, said device being provided with an output circuit including a source of operating current connected across the output electrodes thereof, a source of first pulses connected to said control electrode for periodically rendering said device conductive, quenching means in said output circuit adapted to restore said device from said conductive condition to a non-conductive state, and a source of second pulses synchronized with said source of first pulses connected to said quenching means for periodically rendering the latter effective, and timer means coupled with said pulse sources for varying the relative spacing of the respective pulses thereof, thereby limiting the conductive condition of said device to an interval of adjustable duration.

3. A generator of alternating current comprising a pair of electronic breakdown devices each with two output electrodes and a control electrode for triggering it into a conductive condition, said devices being provided with an output circuit including a source of operating current connected across the respective output electrodes thereof, a source of first pulses connected to said control electrodes for alternately rendering said devices conductive, quenching means in said output circuit adapted to restore said devices from said conductive condition to a non-conductive state, and a source of second pulses synchronized with said source of first pulses connected to said quenching means for periodically rendering the latter effective, thereby limiting the conductive condition of each of said devices to an interval of predetermined duration.

4. A generator of alternating current, comprising a pair of electronic breakdown devices each with two output electrodes and a control electrode for triggering it into a conductive condition, said devices being provided with an output circuit including a source of operating current connected across the respective output electrodes thereof, a source of first pulses connected to said control electrodes for alternately rendering said devices conductive, quenching means in said output circuit adapted to restore said devices from said conductive condition to a non-conductive state, a source of second pulses synchronized with said source of first pulses connected to said quenching means for periodically rendering the latter effective, and timer means coupled with said pulse sources for varying the relative spacing of the respective pulses thereof, thereby limiting the conductive condition of each of said devices to an interval of adjustable duration.

5. A generator according to claim 4 wherein said pulse sources comprise a source of alternating current of substantially fixed frequency and two differentiation circuits concurrently driven by said alternating-current source.

6. A generator according to claim 5 wherein said timer means comprises a delay device inserted between said alternating-current source and one of said differentiation circuits.

7. A generator according to claim 6 wherein said delay device comprises a magnetic amplifier.

8. A generator according to claim 7 wherein said magnetic amplifier has a control winding coupled to said output circuit for stabilizing the operation of said breakdown devices.

9. A generator according to claim 8, further comprising an avalanche diode connected in series with said control winding for normal operation at a near-breakdown point of its characteristic.

10. A generator according to claim 7 wherein said magnetic amplifier has a control winding, further comprising a source of signals of relatively low frequency connected across said control winding for varying the output of said breakdown device.

11. A generator of alternating current, comprising an electronic breakdown device with two output electrodes and a control electrode for triggering it into a conductive condition, said device being provided with an output circuit including a source of operating current across the output electrodes thereof, a source of first pulses connected to said control electrode for periodically rendering said device conductive, quenching means serially included in said output circuit for restoring said device from said conductive condition to a non-conductive state by temporarily discontinuing current flow in said circuit, a source of second pulses synchronized with said source of first pulses connected to said quenching means for periodically rendering the latter effective, and timer means coupled with said pulse sources for varying the relative spacing of the respective pulses thereof, thereby ilimiting the conductive condition of said device to an interval of adjustable duration.

12. A generator of alternating current, comprising a pair of electronic breakdown devices each with two output electrodes and a control electrode for triggering it into a conductive condition, said devices being provided with an output circuit including a source of operating current connected across the respectve output electrodes thereof, a source of first pulses connected to said control electrodes for alternately rendering said devices conductive, quenching meas serially included in said output circuit for restoring said devices from said conductive condition to a non-conductive state by temporarily discontinuing current flow in said circuit, a source of second pulses synchronized with said source of first pulses connected to said quenching means for periodically rendering the latter effective, and timer means coupled with said pulse sources for varying the relative spacing of the respective pulses thereof, thereby limiting the conductive condition of each of said devices to an interval of adjustable duration.

13. A generator according to claim 12 wherin said quenching means comprises an amplifier device having an input circuit connected across said source of second pulses.

14. A generator according to claim 12 wherein said quenching means comprises a secondary winding of a transformer having an additional breadown device connected across its primary winding, said additional breakdown device having an input circuit connected across said source of second pulses and an output circuit provided with capacitive means for extinguishing conduction therethrough at the end of an interval which is short compared with the cadence of said first and second pulses.

15. A generator according to claim 14 wherein said capacitive means comprises a condenser shunted by a high leakage resistance.

16. A generator of alternating current, comprising an electronic breakdown device with two output electrodes and a control electrode for triggering it into a conductive condition, said device being provided with an output circuit including a source of direct current connected across the output electrodes thereof, means for applying to said control electrode a train of first pulses having a predetermined cadence, thereby periodically rendering said device conductive, quenching means adapted to restore said device from said conductive condition to a non-conductive state, and means for applying to said quenching means a train of second pulses having the same cadence for periodically rendering said quenching means effective, thereby limiting the conductive condition of said device to an interval of predetermined duration.

17. A generator according to claim 16, further comprising a resonant network reactively coupled to said output circuit, said network being tuned to a frequency substantially corresponding to said cadence.

18. A generator of alternating current, comprising a pair of electronic breakdown devices each with two output electrodes and a control electrode for triggering it into a conductive condition, said devices being provided with an output circuit including a source of direct current connected across the respective output electrodes thereof, means for applying to the control electrode of one of said devices a train of first pulses having a predetermined cadence and to the control electrode of the other of said devices a train of second pulses having the same cadence and interleaved with said first pulses, thereby alternately rendering said devices conductive, quenching means adapted to restore said devices from said conductive condition to a non-conductive state, and means for applying to said quenching means a train of third pulses having twice said cadence for periodically rendering said quenching means effective, thereby limiting the conductive condition of each of said devices to an interval of predetermined duration.

19. A generator of alternating current, comprising a pair of electronic breakdown devices each with two output electrodes and a control electrode for triggering it into a conductive condition, said devices being provided with an output circuit including a source of direct current connected across the respective output electrodes thereof, means for applying to the control electrode of one of said devices a train of first pulses having a predetermined cadence and to the control electrode of the other of said devices a train of second pulses having the same cadence and interleaved with said first pulses, thereby alternately rendering said devices conductive, quenching means adapted to restore said devices from said conductive condition to a non-conductive state, said quenching means including a circuit element in series with said direct-current source and said output electrodes and further including a resonant network reactively coupled with said output circuit, said circuit element being triggerable into a high-impedance condition for temporarily discontinuing current flow in said output circuit, said network being tuned to a frequency substantially corresponding to said cadence, and means for applying to said circuit element a train of third pulses having twice said cadence for periodically triggering it into said high-impedance condition, thereby limiting the conductive condition of each of said devices to an interval of predetermined duration.

No references cited.